US009882700B2

(12) United States Patent
Yin et al.

(10) Patent No.: US 9,882,700 B2
(45) Date of Patent: Jan. 30, 2018

(54) SYSTEMS AND METHODS FOR BACKOFF PROCEDURES FOR LICENSED-ASSISTED ACCESS

(71) Applicant: Sharp Laboratories of America, Inc., Camas, WA (US)

(72) Inventors: Zhanping Yin, Vancouver, WA (US); Toshizo Nogami, Vancouver, WA (US); John Michael Kowalski, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/195,855

(22) Filed: Jun. 28, 2016

(65) Prior Publication Data

US 2017/0005768 A1 Jan. 5, 2017

Related U.S. Application Data

(60) Provisional application No. 62/186,661, filed on Jun. 30, 2015.

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1825* (2013.01); *H04L 1/1867* (2013.01);
(Continued)

(58) Field of Classification Search
CPC ....... H04L 1/1825; H04L 1/1867; H04L 1/18; H04L 47/27; H04L 5/0055; H04W 74/02;
(Continued)

(56) References Cited

U.S. PATENT DOCUMENTS

| 8,306,050 | B2 | 11/2012 | Ho | |
|---|---|---|---|---|
| 2005/0070317 | A1* | 3/2005 | Liu | H04W 74/085 455/502 |
| 2012/0106371 | A1* | 5/2012 | Abraham | H04B 7/0452 370/252 |

FOREIGN PATENT DOCUMENTS

| EP | 2612473 | 3/2012 |
| GB | 2491139 | 11/2012 |
| WO | WO2014111309 | 7/2014 |

OTHER PUBLICATIONS

Alcatel-Lucent Shanghai Bell et al: "LBT and Frame Structure Design for DL-Only LAA", May 24, 2015.*
(Continued)

*Primary Examiner* — Ian N Moore
*Assistant Examiner* — Mewale Ambaye
(74) *Attorney, Agent, or Firm* — Austin Rapp

(57) ABSTRACT

An evolved NodeB (eNB) is described. The eNB includes a processor and memory in electronic communication with the processor. Instructions stored in the memory are executable to maintain a contention window size. The instructions are also executable to increase the contention window size according to hybrid automatic request acknowledgement/negative acknowledgment (HARQ-ACK) value(s) corresponding to physical downlink shared channel (PDSCH) transmission(s) in a first subframe. The first subframe is a starting subframe of a previous downlink transmission burst on a licensed-assisted access (LAA) carrier for which HARQ-ACK has been fed back.

6 Claims, 9 Drawing Sheets

(51) Int. Cl.
| | |
|---|---|
| *H04W 74/02* | (2009.01) |
| *H04W 74/08* | (2009.01) |
| *H04L 12/807* | (2013.01) |
| *H04W 72/04* | (2009.01) |
| *H04W 76/04* | (2009.01) |

(52) U.S. Cl.
CPC ............ *H04L 47/27* (2013.01); *H04W 72/042* (2013.01); *H04W 72/0446* (2013.01); *H04W 74/02* (2013.01); *H04W 74/08* (2013.01); *H04W 76/048* (2013.01)

(58) Field of Classification Search
CPC ............................ H04W 74/08; H04W 72/042; H04W 72/0446
See application file for complete search history.

(56) References Cited

OTHER PUBLICATIONS

LG Electronics et al. (hereinafter referred as LG) LG Electronics: "DL LBT operation with variable contention window size" 3GPP Draft;R1-152732 CAT 4 Design Final, May 16, 2015.*
ZTE, "LBT Design for LAA," 3GPP TSG RAN WG1 Meeting #81, R1-153012, May 25, 2015.
Catt, "Design of LBT Category 4," 3GPP TSG RAN WG1 Meeting #81, R1-152577, May 25, 2015.
Catt, "Schemes for LAA DL data transmissions," 3GPP TSG RAN WG1 Meeting #81, R1-152578, May 25, 2015.
Intel Corporation, "Category 4 based LBT design for LAA downlink," 3GPP TSG RAN WG1 RAN1 #81, R1-152646, May 25, 2015.
LG Electronics, "DL LBT operation with variable contention window size," 3GPP TSG RAN WG1 meeting #81, R1-152732, May 25, 2015.
LG Electronics, "LBT Operation for LAA DL," 3GPP TSG RAN WG1 Meeting #81, R1-152733, May 25, 2015.
LG Electronics, "LBT operation for LAA UL," 3GPP TSG RAN WG1 Meeting #81, R1-152735, May 25, 2015.
Nokia Networks, "On design options for LAA LBT enabling frequency reuse," 3GPP TSG RAN WG1 Meeting #81, R1-152812, May 25, 2015.
Samsung, "Further discussion on LBT for LAA DL transmission," 3GPP TSG RAN WG1 Meeting #81, R1-152874, May 25, 2015.
Broadcom Corporation, "LBT Category 4 Design for LAA DL," 3GPP TSG-RAN WG1 Meeting #81, R1-152936, May 25, 2015.
Alcatel-Lucent Shanghai Bell, Alcatel-Lucent, "LBT and Frame Structure Design for LAA with DL and UL," 3GPP TSG RAN WG1 Meeting #81, R1-152990, May 25, 2015.
ETRI, "Considerations on LBT design for LAA," 3GPP TSG RAN WG1 Meeting #81, R1-153002, May 25, 2015.
InterDigital Communications, "LBT and DL transmission in LAA," 3GPP TSG-RAN WG1 Meeting #81, R1-153142, May 25, 2015.
Huawei, HiSilicon, "LBT design for LAA-LAA coexistence and support of reuse 1," 3GPP TSG RAN WG1 81 Meeting, R1-153229, May 25, 2015.
MediaTek Inc., "LBT design for LAA," 3GPP TSG RAN WG1 meeting #81, R1-153260, May 25, 2015.
Coolpad, "Discussion on the enhancements of LBT schemes," 3GPP TSG RAN WG1 Meeting #81, R1-153308, May 25, 2015.
Zhang Ning et al., "Unlicensed Specrum Usage Method for Cellular Communication Systems," Wireless Communications, Networking and Mobile Computing (WiCOM) 2012, Shanghai, China, Sep. 1, 2012.
A.R. Elsherif et al., "Adaptive Small Cell Access of Licensed and Unlicensed Bands," IEEE International Conference on Communications (ICC) 2013, Budapest, Hungary, Jun. 1, 2013.
Amitav Mukherjee et al., "System Architecture and Coexistence Evaluation of Licensed-Assisted Access LTE with IEEE 802.11," ICC, 2015.
3GPP TR 36.889 v1.0.1, "Study on Licensed-Assisted Access to Unlicensed Spectrum (Release 13)," Jun. 1, 2015.
Search Report and Written Opinion issued for International Application No. PCT/US2016/040185 dated Oct. 7, 2016.
Alcatel-Lucent Shanghai Bell, Alcatel-Lucent, "LBT and Frame Structure Design for DL-Only LAA," 3GPP TSG RAN WG1 Meeting #81, R1-153385, May 29, 2015.

* cited by examiner

SYSTEMS AND METHODS FOR BACKOFF PROCEDURES FOR LICENSED-ASSISTED ACCESS

RELATED APPLICATIONS

This application is related to and claims priority from U.S. Provisional Patent Application No. 62/186,661, entitled "SYSTEMS AND METHODS FOR BACKOFF PROCEDURES FOR LICENSED-ASSISTED ACCESS," filed on Jun. 30, 2015, which is hereby incorporated by reference herein, in its entirety.

TECHNICAL FIELD

The present disclosure relates generally to communication systems. More specifically, the present disclosure relates to systems and methods for backoff procedures for licensed-assisted access (LAA).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
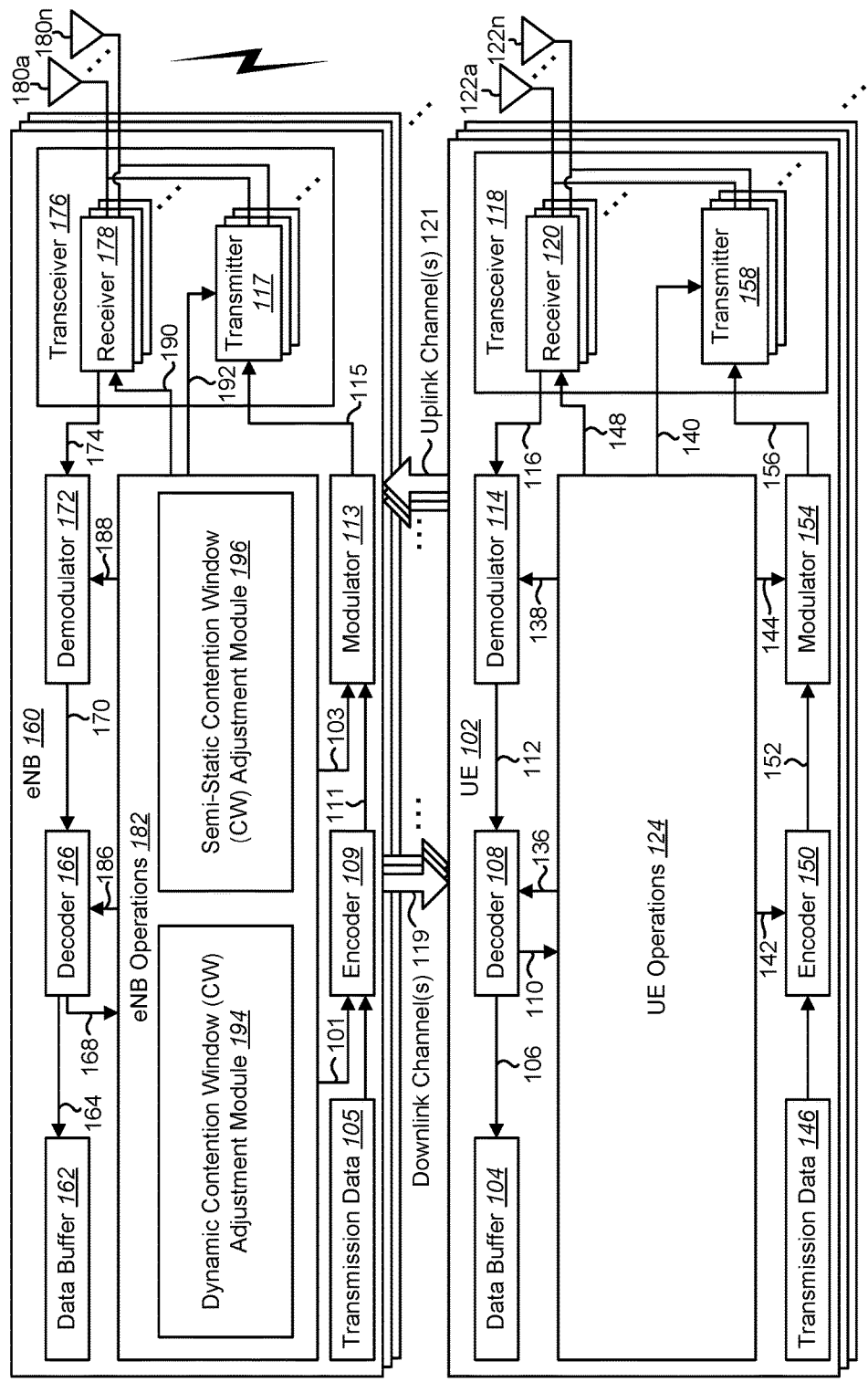
FIG. 1 is a block diagram illustrating one implementation of one or more evolved NodeBs (eNBs) and one or more user equipments (UEs) in which systems and methods for licensed-assisted access (LAA) may be implemented.

An evolved NodeB (eNB) is described. The eNB includes a processor and memory in electronic communication with the processor. Instructions stored in the memory are executable to maintain a contention window size. The instructions are also executable to increase the contention window size according to hybrid automatic request acknowledgement/negative acknowledgment (HARQ-ACK) value(s) corresponding to physical downlink shared channel (PDSCH) transmission(s) in a first subframe. The first subframe is a starting subframe of a previous downlink transmission burst on a licensed-assisted access (LAA) carrier for which HARQ-ACK has been fed back.

The contention window size may be increased if a predetermined percentage or more of the HARQ-ACK value(s) are determined as negative acknowledgment (NACK). A discontinuous transmission (DTX) state may be counted as NACK. A backoff counter may be generated by using the contention window size.

A method for an eNB is also described. The method includes maintaining a contention window size. The method also includes increasing the contention window size according to HARQ-ACK value(s) corresponding to PDSCH transmission(s) in a first subframe. The first subframe is a starting subframe of a previous downlink transmission burst on a LAA carrier for which HARQ-ACK has been fed back.

An eNB for contention access of an LAA serving cell is also described. The eNB includes a processor and memory in electronic communication with the processor. Instructions stored in the memory are executable to determine a collision status. The instructions are also executable to determine the contention window (CW) size for LAA access based on the collision status. The instructions are further executable to perform channel access and backoff procedures based on the determined CW size.

The collision status may be based on a previous LAA transmission. The collision status may be set as a collision occurs based on the HARQ-ACK feedback of the previous LAA transmission.

The collision status may be set as a collision occurs if any subframe of an LAA subframe burst or transmission opportunity (TxOP) is reported as NACK or DTX from scheduled user equipments (UEs). The collision status may be set as no collision occurs if all subframes of the LAA subframe burst or TxOP are reported as ACK from the scheduled UEs. The collision status may be set as a collision occurs in a subframe if there are multiple PDSCH transmissions scheduled for multiple UEs and any UE reports a NACK or DTX for the scheduled PDSCH of the subframe.

The collision status may be set as a collision occurs if the first subframe in an LAA subframe burst or TxOP is reported as NACK or DTX from scheduled UEs. The collision status may be set as no collision occurs if the first subframe in the LAA subframe burst or TxOP is reported as ACK from the scheduled UEs.

An N_NACKed may be determined as an expected number of subframes reported as NACK or DTX. The number of subframes in an LAA subframe burst or TxOP that are reported as NACK or DTX from scheduled UEs may be determined. The collision status may be set as a collision occurs if there are N_NACKed or more subframes in the LAA subframe burst or TxOP that are reported as NACK or DTX from the scheduled UEs. N_NACKed may be set as a fixed number. N_NACKed may be configured with higher layer signaling.

The instructions may also be executable to determine if an LAA subframe is an initial transmission. If the LAA subframe is an initial transmission, the NACK or DTX feedback of the LAA subframe may not be treated as a NACK or DTX.

The instructions may be also executable to determine a collision condition based on a retransmission status of subframes in an LAA subframe burst or TxOP.

An N_ReTx may be determined as a threshold number of retransmissions. The number of subframes with retransmission in an LAA subframe burst or TxOP may be determined. The collision status may be set as a collision occurs if the number of subframes with retransmission in the LAA subframe burst or TxOP is greater or equal to N_ReTx.

The number of retransmissions of the subframes in an LAA subframe burst or TxOP may be determined. The collision status may be determined based on the number of retransmissions of the subframes in the LAA subframe burst or TxOP. In one implementation, the number of retransmissions of the subframes in the LAA subframe burst or TxOP may be determined based on the maximum number of retransmissions of the subframes in the LAA subframe burst or TxOP. In another implementation, the number of retransmissions of the subframes in the LAA subframe burst or TxOP may be determined based on the average number of retransmissions of the subframes in the LAA subframe burst or TxOP.

The CW size may be increased if the eNB sets the collision status as a collision occurs. The CW size may be decreased if the eNB sets the collision status as no collision occurs. The CW size may be set as the initial CW size if the eNB determines that no collision occurs.

The CW size may be determined based on a look-up table. The look-up table may specify a correspondence between the CW size and the number of NACK of DTX received in an LAA subframe burst or TxOP. The look-up table may specify a correspondence between the CW size and the number of subframes with retransmissions in an LAA subframe burst or TxOP. The look-up table may specify a correspondence between the CW size and the number of retransmissions of the subframes in an LAA subframe burst or TxOP.

The CW size may be updated semi-statically based on statistic results. The statistic results may be determined based on an observed channel occupancy. The statistic results may be determined based on an average length of idle period. The statistic results may be determined based on an average number of NACK or DTX received in an LAA subframe burst or TxOP. The statistic results may be determined based on an average number of retransmissions in an LAA subframe burst or TxOP.

The instructions may also be executable to determine a time to obtain the CW size. The instructions may further be executable to determine a time to apply the determined CW size.

The CW size may be determined after all HARQ-ACK feedback is received for an LAA subframe burst or TxOP. The CW size may be determined at a fixed timing. The CW size may be determined at a timing that is configured by higher layer signaling.

The CW size may be determined before contention access based on the retransmission status of pending subframes.

The CW size may be determined before contention access based on the retransmission status of all HARQ-ACK processes.

The determined CW size may be obtained. If there is an ongoing contention backoff process, the determined CW size may be applied after the ongoing backoff process is completed.

The determined CW size may be obtained. If there is an ongoing contention backoff process, the determined CW size may be applied immediately to start a new backoff process and terminate the ongoing backoff process.

The determined CW size may be obtained. The determined CW size may be applied immediately after the previous LAA subframe burst or TxOP.

A method for contention access of an LAA serving cell by an eNB is also described. The method includes determining a collision status. The method also includes determining the CW size for LAA access based on the collision status. The method further includes performing channel access and backoff procedures based on the determined CW size.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB,"

and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed may involve carrier aggregation. Carrier aggregation refers to the concurrent utilization of more than one carrier. In carrier aggregation, more than one cell may be aggregated to a UE. In one example, carrier aggregation may be used to increase the effective bandwidth available to a UE. The same time division duplexing (TDD) uplink-downlink (UL/DL) configuration has to be used for TDD carrier aggregation (CA) in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

Licensed-assisted access (LAA) may support LTE in unlicensed spectrum. In an LAA network, the DL transmission may be scheduled in an opportunistic manner. For fairness utilization, an LAA eNB may perform functions such as clear channel assessment (CCA), listen before talk (LBT) and dynamic frequency selection (DFS) before transmission. When the eNB performs LBT, the eNB cannot transmit any signals, including reference signals.

To perform contention channel access, some extended CCA (ECCA) mechanisms may be specified for an LAA node. At least for a DL LAA transmission, listen before talk (LBT) with a variable backoff contention window (CW) size may be supported. The CW size may be dynamically or semi-statically adjusted, as described by the systems and methods herein.

In some approaches, CW adjustment may be performed using hybrid automatic request acknowledgement/negative acknowledgment (HARQ-ACK) feedback and channel sensing feedback. The systems and methods herein describe dynamic CW adjustment (including exponential backoff) for LAA LBT algorithms. Furthermore, the described systems and methods also provide for semi-static CW adjustment based on observed channel conditions and feedback.

In an implementation, a variable length contention access may be used. In an initial and extended CCA procedure, a contention window may be used to generate a random number for the backoff counter. However, how to set the CW size and how to adjust the CW size may be further defined.

The described systems and methods provide for variable CW size adjustments of LAA transmission. In one approach, the CW size is dynamically determined based on HARQ-ACK feedback results. The HARQ-ACK feedback for each HARQ-ACK process and each subframe may be considered jointly. Furthermore, the number of subframe retransmissions is taking into account.

In another approach, the CW size can be semi-statically determined based on statistic results or sensing results. The described approaches may be applied to determine the initial CW size and to reduce the levels of CW changes.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for LAA may be implemented. The one or more UEs 102 communicate with one or more eNBs 160 using one or more antennas 122*a-n*. For example, a UE 102 transmits electromagnetic signals to the eNB 160 and receives electromagnetic signals from the eNB 160 using the one or more antennas 122*a-n*. The eNB 160 communicates with the UE 102 using the one or more antennas 180*a-n*.

The UE 102 and the eNB 160 may use one or more channels 119, 121 to communicate with each other. For example, a UE 102 may transmit information or data to the eNB 160 using one or more uplink channels 121. Examples of uplink channels 121 include a physical uplink control channel (PUCCH) and a physical uplink shared channel (PUSCH), etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include physical downlink shared channel (PDSCH) HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of a dynamic contention window (CW) adjustment module 194 and a semi-static CW adjustment module 196.

The Licensed-Assisted Access (LAA) in an unlicensed band for LTE (also referred to as LTE unlicensed or unlicensed LTE) allows opportunistic usage of one or more unlicensed carriers for LTE transmissions.

The LAA transmission is assisted with a licensed band. Carrier aggregation (CA) is one operation that may be performed with an unlicensed LAA cell operating with a licensed LTE cell. With CA, the radio frame (e.g., the system frame number (SFN)) may be synchronized across all serving cells. Furthermore, the subframe indexes may also be synchronized. For a DL LAA transmission, the HARQ-ACK feedback of the LAA subframes may be reported on a licensed UL carrier (e.g., the primary cell (PCell) uplink).

As used herein, the term LAA cell refers to a set of communication channels between a UE 102 and an eNB 160 in which LAA operations may be performed. An LAA cell refers to a serving cell that operates on an unlicensed carrier. In current definition, an LAA cell can only be a secondary cell, and is configured by a licensed cell. An LAA cell may also be referred to as an LAA serving cell.

In an LAA network, a DL or UL transmission may be scheduled in an opportunistic manner. For fairness utilization, an LAA node (e.g., an LAA eNB or an LAA UE) is required to perform some functions (e.g. clear channel assessment (CCA), listen before talk (LBT)) before any transmission. Thus, an LAA transmission cannot guarantee a transmission at fixed subframe boundaries.

Therefore, an LAA subframe transmission may need to perform carrier sensing, and if there is no ongoing transmission, the LAA subframe may be transmitted. Otherwise, the LAA node should defer the transmission and perform clear channel assessment (CCA) again at the next contention access region.

In LAA, the serving cell should be synchronized with a licensed cell. The time used for carrier sensing and CCA will be removed from the first LAA subframe transmission.

In Institute of Electrical and Electronics Engineers (IEEE) 802.11-based WiFi, a successful packet transmission is acknowledged by an acknowledgment (ACK) packet. If no ACK is received as expected, a WiFi transmitter may assume that a collision occurs. The WiFi transmitter may adjust the CW size and reinitialize the backoff counter based on the new CW size. The CW size may range from an initial CW size (CW0) to a maximum CW size (CWmax). The CW size may return back to the initial CW size for each new packet transmission.

For LTE transmission, there is no immediate ACK for a subframe. The HARQ-ACK report may be used to indicate the reception status of a LTE subframe. The HARQ-ACK is at least 4 milliseconds (ms) after an LTE subframe transmission. Thus, the HARQ-ACK cannot provide a very timely response as in WiFi. Furthermore, an LAA burst or transmit opportunity (TxOP) may include multiple subframes with different HARQ-ACK feedback results. The CW size for the next transmission may need to consider the feedback of a previous PDSCH transmission as well as initial transmissions of new PDSCH.

In the case of an LTE PDSCH transmission, HARQ-ACK feedback for PDSCH transmissions may include a discontinuous transmission (DTX) with no HARQ-ACK feedback provided. If the UE 102 does not detect any PDCCH or enhanced PDCCH (EPDCCH) scheduling information for a PDSCH in a subframe, then the UE 102 will assume no PDSCH is transmitted to it, and may provide no feedback. In other words, a PUCCH for HARQ-ACK is not transmitted.

Another HARQ-ACK feedback for PDSCH transmissions includes DTX with HARQ-ACK feedback from other cells. In a subframe, if the UE 102 receives at least PDSCH scheduling information on a PDCCH or an EPDCCH in the configured cells, HARQ-ACK bits may be reported. In the given subframe, one or two DTX bits are reported for a configured cell with no detected PDSCH transmission depending on the configured transmission modes.

As a special case, if PUCCH format 3 is configured, and the UE 102 only detects one PDSCH transmission on the PCell, HARQ-ACK may be reported on PUCCH format 1a/1b. If a PDSCH is also scheduled on a secondary cell (SCell) in the same subframe, the eNB 160 can assume a DTX is reported for the given SCell.

Yet another HARQ-ACK feedback for PDSCH transmissions includes negative acknowledgment (NACK) bits. If the UE 102 receives PDSCH scheduling information for a PDCCH or an EPDCCH but cannot correctly decode the corresponding PDSCH, the UE 102 may report one or two bits of NACK for the serving cell depending on the transmission mode.

Another HARQ-ACK feedback for PDSCH transmissions includes ACK bits. If the UE 102 receives PDSCH scheduling information for a PDCCH or an EPDCCH and correctly decodes the corresponding PDSCH, the UE 102 may report one or two bits of ACK for the serving cell depending on the transmission mode, PUCCH formats and/or HARQ-ACK bundling configurations.

In some implementations of LTE DL LAA transmissions, an LAA cell may only be configured as an SCell. The HARQ-ACK feedback for a PDSCH transmission on an LAA cell that does not indicate successful reception may be caused by different reasons.

A DTX may be caused by misdetection of PDCCH or PDSCH, or a collision with other unlicensed transmissions (e.g., LAA transmissions, WiFi transmissions, etc.). A NACK may be caused by a decoding error of received PDSCH, or a collision with other unlicensed transmissions (e.g., LAA, WiFi, etc.).

An LAA transmit opportunity (TxOP) may include one or two partial subframes that include fewer OFDM symbols than a regular LTE subframe. The NACK probability for a PDSCH on a partial subframe may be much higher than the same transmit block (TB) carried on a regular LTE subframe because a partial subframe contains fewer resource elements (REs) if the same modulation and coding scheme (MCS) setting is used as a normal LTE subframe.

Figure 3:
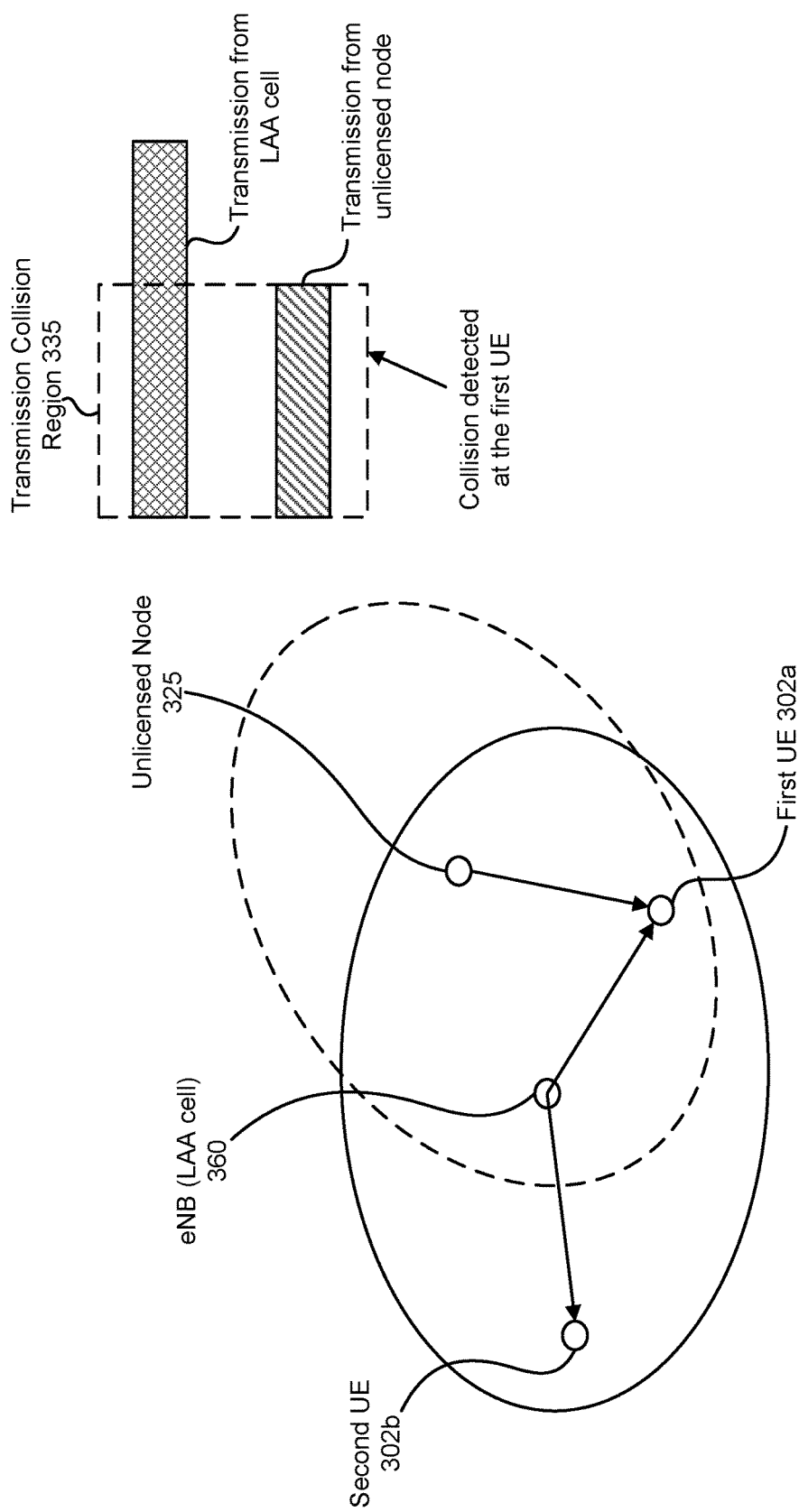
FIG. 3 illustrates an example of collision due to simultaneous transmissions.

In an LAA transmission, collision may occur in different conditions. In one scenario, simultaneous transmission within an ECCA slot may occur from another unlicensed transmission within the sensing distance of the given LAA cell. This scenario is shown in FIG. 3. This scenario is likely to cause reception errors at one or more UEs 102, especially in the beginning of the LAA TxOP. These kinds of collisions may be reduced by adjusting the CW size.

Figure 4:
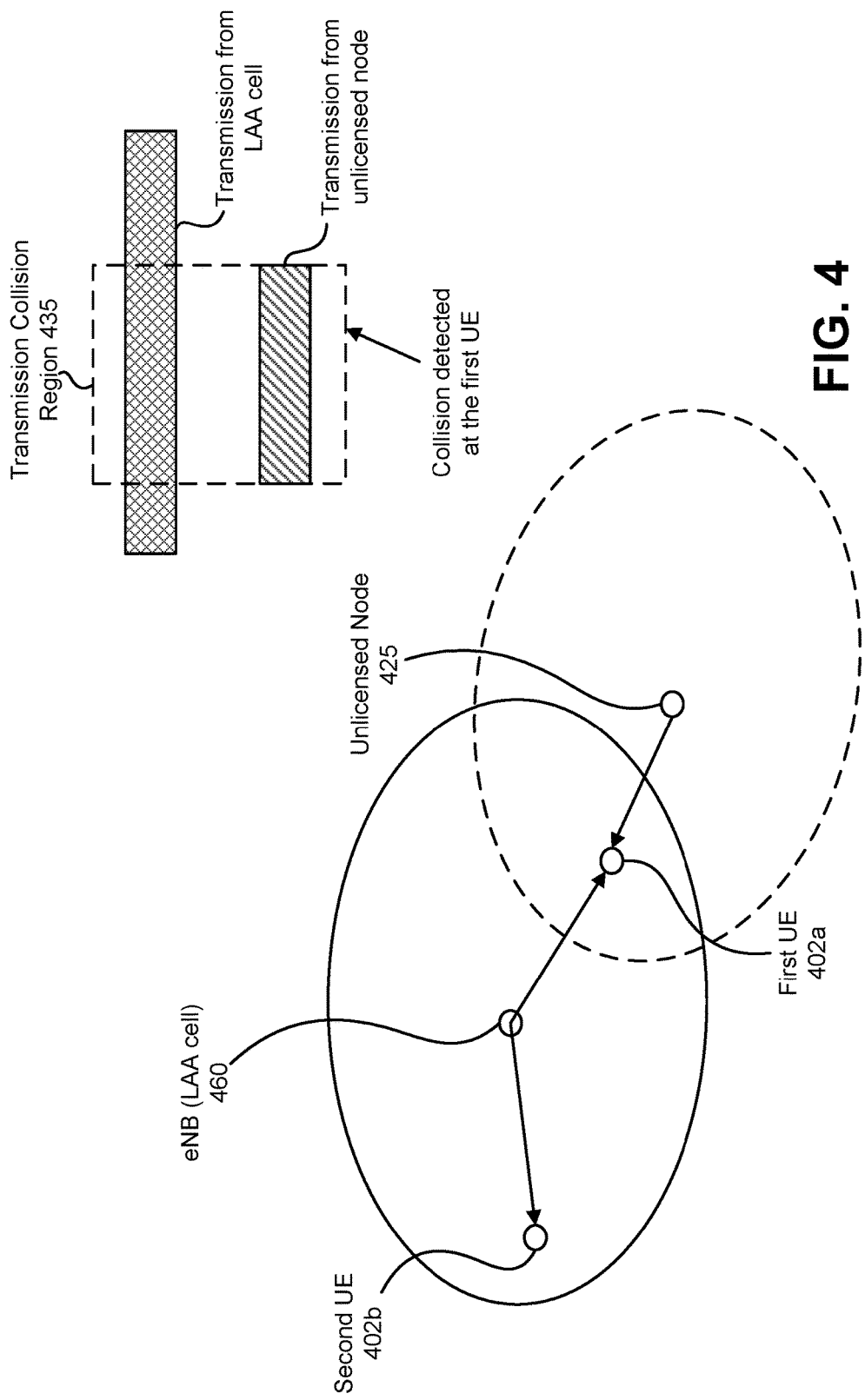
FIG. 4 illustrates an example of collision due to simultaneous transmission of a hidden terminal.

In another scenario, transmission from hidden terminals of the LAA cell may cause reception problems at one or more receiving UEs 102, as shown in FIG. 4. This may cause reception errors at any part of an LAA TxOP. In 802.11, the request to send/clear to send (RTS/CTS) exchange may be used to avoid hidden terminal issues. However, there is no similar immediate feedback available in LTE DL transmissions. This type of collision may be difficult to detect or avoid.

For carrier aggregation (CA) where multiple cells are configured for a UE 102, it may be hard to differentiate a DTX or a NACK bit. For example, in PUCCH format 3, both DTX and NACK are reported as 0. Some LAA subframes may not contain any PDSCH transmissions, thus no HARQ-ACK will be reported.

In a special case, if only a single PDSCH is scheduled on an LAA SCell, if the UE 102 does not detect the PDCCH for the PDSCH scheduling, the UE 102 will not report HARQ-ACK on a PUCCH or PUSCH. If the UE 102 detects a PDCCH but cannot decode the corresponding PDSCH, the UE 102 reports a NACK. The eNB 160 can differentiate a DTX from a NACK in this case.

If a UE 102 receives only a single PDSCH transmission on the PCell, the UE 102 will report HARQ-ACK on a PUCCH format 1a/1b. In all other cases, for UEs 102 configured with CA, the HARQ-ACK bits are generated based on the configured component carriers (CCs). Thus, if a UE 102 does not detect a PDCCH/EPDCCH that schedules a PDSCH on a serving cell, a NACK or DTX may be reported for the given serving cell. The eNB 160 may consider only the HARQ-ACK bits from the UEs 102 with scheduled PDSCH transmissions. The eNB 160 may ignore the NACK or DTX feedback from other UEs 102 that are not scheduled with PDSCH transmissions.

Furthermore, a HARQ-ACK report cannot tell whether a packet loss is caused due to collision, detection error or decoding error. In fact, the LTE transmission is designed to have a high NACK probability, especially for an initial transmission. The NACK probability may be 10% or more. Therefore, for an LAA PDSCH transmission, if all NACK or DTX are treated as collisions, the channel congestion condition will be exaggerated.

Also, there may be multiple subframes targeted to multiple UEs 102 in an LAA subframe burst or a transmission opportunity (TxOP). As used herein, an LAA subframe burst includes a group of multiple LAA subframes that are transmitted on the DL to one or more UEs 102. An LAA subframe burst may also be referred to as an LAA transmission burst, an LAA burst, a DL burst, a TxOP or simply as a burst.

The HARQ-ACK feedback of these subframes in the LAA subframe burst may be from multiple UEs 102. Depending on the location of the receiver UE 102, the HARQ-ACK results may indicate the local channel conditions only. In the examples described in connection with FIG. 3 and FIG. 4, the collision may impact the reception of at least one UE 102 (e.g., the first UE in these two figures). But other UEs 102 may not detect a collision for the same LAA subframes (e.g. the second UE in these two figures). If all NACK or DTX feedback from any UE 102 is treated as collision, the channel collision probability will be further excessively over-estimated.

Therefore, the HARQ-ACK may be used to determine whether a collision occurs, but there are some fundamental problems with using HARQ-ACK to predict a collision. One problem is the difficulty in distinguishing a collision and a normal NACK/DTX. Another problem is the high probability of NACK with HARQ processes, especially for an initial transmission. Yet another problem is that HARQ-ACK from one UE 102 does not tell the condition observed at other UEs 102.

The eNB 160 may perform an adaptive backoff adjustment. In one implementation, the dynamic contention window (CW) adjustment module 194 may dynamically adjust the CWS based on the available feedback and assessment. When no immediate ACK from the receiver is available, a HARQ-ACK report of LAA subframes may indicate the status of an LAA subframe transmission. Thus, the HARQ-ACK feedback may be used to assess whether a collision occurs on the LAA transmissions, even though there are issues with this approach, as mentioned above.

An LAA transmission burst or TxOP may include multiple subframes. Each subframe may contain PDSCH for one or more UEs 102. The eNB 160 may obtain HACK-ACK reports from all scheduled PDSCH transmissions from all scheduled UEs 102.

Figure 5:
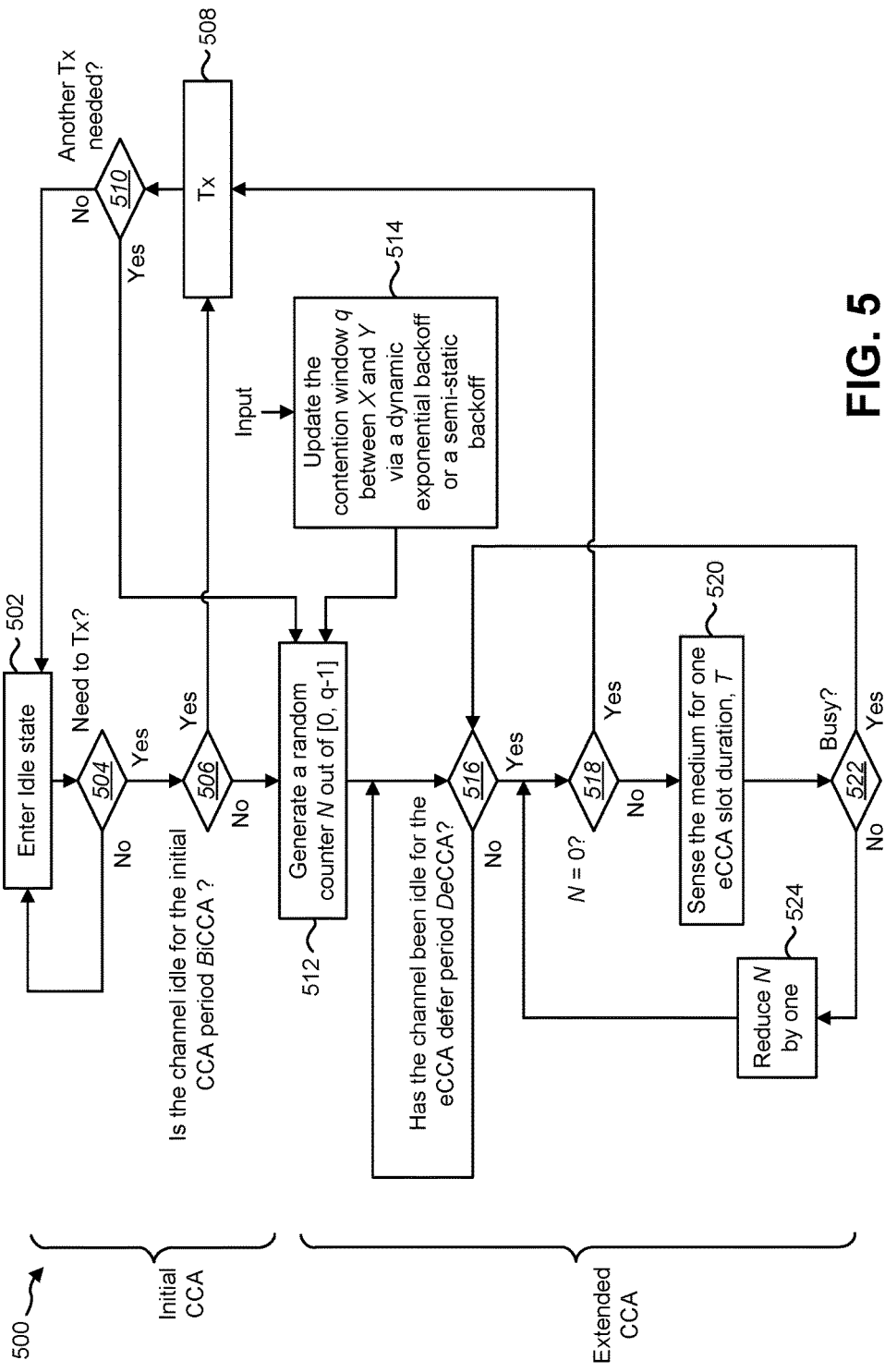
FIG. 5 is a flow diagram illustrating a method for LAA state transition with variable length backoff.

In an example, the LAA cell may be configured with an initial CW size or minimum CW size X=CW0, and a maximum CW size Y=CWmax. A backoff process may be required after the initial LAA transmission (as shown in FIG. 5 for continuous LAA transmissions) or for a subframe re-transmission. For dynamic CW adjustment, the CW size may be initiated with CW0, and increased to the next CW size (e.g., double the previous CW size), if a collision is observed, until CWmax is reached.

An example with an LAA subframe burst of 4 LAA subframes is described in connection with FIG. 6. If a minimum gap of 4 ms between a HARQ-ACK feedback and the PDSCH transmission is assumed, 8 ms may be required from the start of the LAA subframe burst transmission to the reception of all HARQ-ACK feedback of the LAA subframes of the burst. Thus, for contention access and backoff immediately after the LAA burst, the current CW size may be used for the next LAA transmission before all HARQ-ACK feedback if received.

The new CW size may be applied after all HARQ-ACK feedback is received and evaluated. In other words, HARQ-ACKs associated with the DL burst that ends at subframe n+3 (i.e., HARQ-ACKs fed back from subframe n−k+8 until subframe n+7, where k is the number of subframes within the corresponding DL burst) could be used for the contention window size derivation for LBT that is potentially performed at subframe n+8 or later.

Conversely, for LBT at subframe n, the HARQ-ACKs associated with the DL burst that ends at subframe n−5 or earlier (i.e., HARQ-ACKs fed back from subframe n−k or earlier until subframe n−1) could be used. Also, some processing time may be considered. Given that the required processing time is x ms, the HARQ-ACKs associated with the DL burst which ends at subframe n+3 could be used for LBT which is potentially performed at subframe n+x+8 or later. In other words, for LBT at subframe n, the HARQ-ACKs associated with the DL burst that ends at subframe n−x−5 or earlier (i.e., HARQ-ACKs fed back from subframe n−x−k or earlier until subframe n−x−1) could be used.

Alternatively, the application of the HARQ-ACK to the contention window size derivation may be based on a fixed timing (e.g., a radio frame basis.) For example, the contention window size of the potential LBT in a radio frame N (or multiple radio frames starting at radio frame N) may be updated on the basis of the HARQ-ACKs reported within radio frame N−1 (or multiple radio frames ending at radio frame N−1). If processing time x is required, the contention window size of the potential LBT in radio frame N (or multiple radio frames starting at radio frame N) may be updated on the basis of the HARQ-ACKs reported within radio frame N−x−1 (or multiple radio frames ending at radio frame N−x−1). The value of the above-described x may be configurable.

The new CW size may be increased from the current CW size if the eNB 160 determines that a collision occurred. The new CW size may be maintained the same as the current CW size or reduced or reset to the initial CW size depending on the estimated channel condition.

If a new CW size is determined to be used after evaluating the HARQ-ACK feedback, in one approach, the new CW size may be applied to the backoff process after the ongoing backoff procedure and LAA transmission. In another approach, if the ongoing backoff process has not completed, the new CW size may be applied immediately by resetting the backoff counter with a new random number between 0 and the new CW size minus 1.

There are many approaches that may be used to estimate the channel collision. In a first approach (Approach 1), the CW may be increased if any LAA subframe has a NACK or DTX reported. As a starting point, if a NACK or DTX is received for any LAA subframe included in the previous LAA burst of subframes, the eNB 160 may assume a collision occurs, and may increase the CW size for the backoff and contention access of the next LAA burst of subframes. If all subframes are reported as ACK, the CW size can be reduced. In one implementation, the CW size may be reduced to the next lower CW size. In another implementation, the CW size may be set to the initial CW size.

In this approach, in an LAA subframe with multiple PDSCH scheduled for multiple UEs 102, if any of them replied a NACK or DTX, then the subframe may be considered as a NACK. However, this will inevitably overestimate the collision probability since the NACK probability is fairly high for a regular LTE subframe transmission, especially for the initial transmission. In general, with an LAA burst of n subframes, each subframe with a NACK probability of p, the probability that at least one subframe is reported as NACK is $1-(1-p)^n$.

Figure 6:
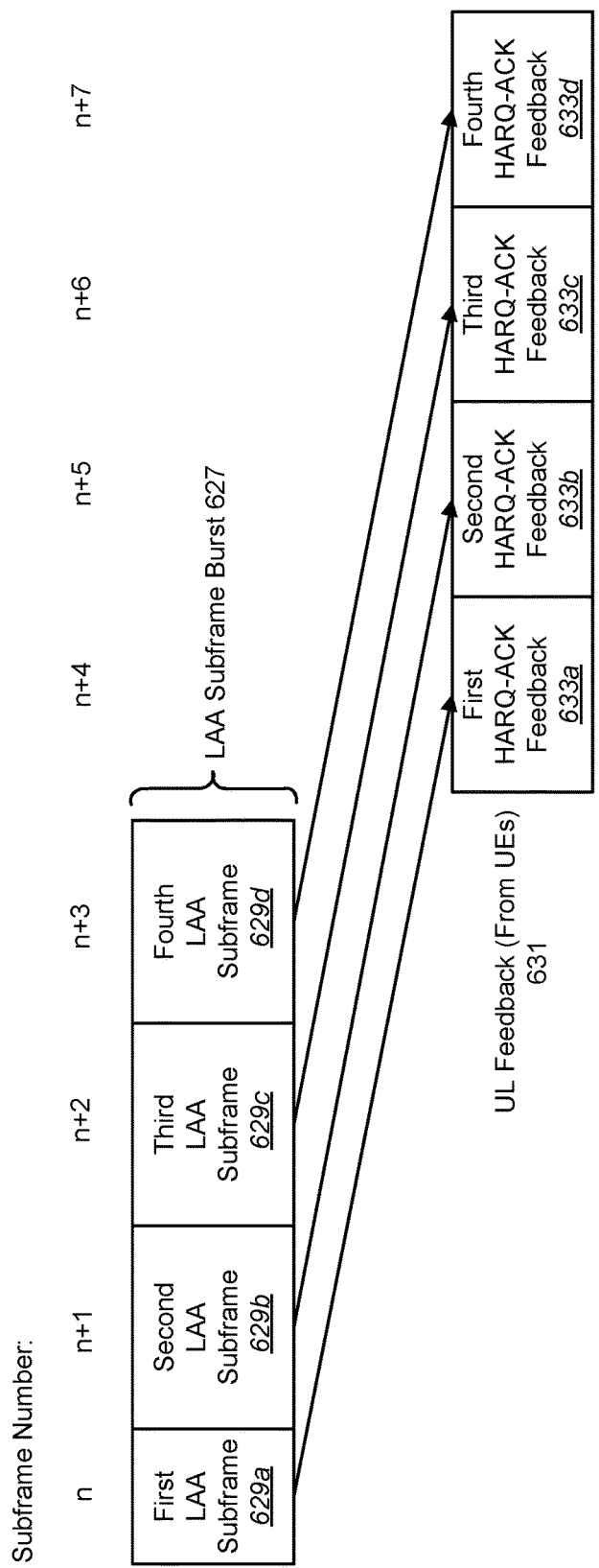
FIG. 6 is a block diagram illustrating hybrid automatic request acknowledgement/negative acknowledgment (HARQ-ACK) feedback for an LAA subframe burst.

Referring to FIG. 6 as an example with 4 subframes in an LAA TxOP, if the NACK probability of each subframe is 10%, then the probability that at least one subframe is NACK is around $1-(1-0.1)^4=34.39\%$ even if no collision occurs. The result will be much higher if the maximum channel occupancy of 10 ms is considered (e.g., 65% with n=10 and p=0.1).

In a second approach for estimating channel collision (Approach 2), the CW may be increased if the first (starting) LAA subframe in a burst has a NACK or a DTX reported. For unlicensed nodes within the sensing distance of an LAA cell, a collision occurs mainly at the beginning of an LAA transmission. Therefore, if only the HARQ-ACK feedback of the first LAA subframe in the burst is used to estimate collision, this considers mainly the collision caused by adjacent unlicensed transmissions within the sensing distance. This overcomes the over-estimate of NACK and HARQ-ACK delay issues in Approach 1 for estimating channel collision. In the case where the first subframe is a partial subframe or no PDSCH is transmitted, the first LAA subframe with full OFDM symbols or with PDSCH scheduled can be used instead of the first subframe in a burst.

If the first subframe is reported as ACK, the CW size can be reduced. In one implementation, the CW size is reduced to the next lower CW size. In another implementation, the CW size may be set to the initial CW size.

With this second approach, the collision due to the hidden terminal problem is largely ignored.

In a third approach for estimating channel collision (Approach 3), the CW may be increased if more than one LAA subframe has a NACK or a DTX reported. If there are multiple subframes in an LAA burst transmission or TxOP, the collision condition may be further constrained if two or more LAA subframes are reported as NACK. This significantly reduces the false-alarm of collision due to NACK feedback of LTE subframes.

In general, with an LAA burst of n subframes, and each subframe with a NACK probability of p, the probability that at least two subframes are reported as NACK is $1-(1-p)^n-n \cdot p(1-p)^{n-1}$.

Referring again to FIG. 6 as an example, with 4 subframes in an LAA TxOP, if the NACK probability of each subframe is 10%, the probability that at least two subframes are reported as NACK is around 5.23% even if no collision occurs. For a maximum channel occupancy of 10 ms, the value is 22%, still very high.

To further reduce the false-detection of collision, the expected number of subframes reported as NACK or DTX (N_NACKed) can be further increased. In general, with an LAA burst of n subframes, each subframe with a NACK probability of p, the probability that at least m subframes are reported as NACK is $$P_{m\_NACK} = 1 - \sum_{k=0}^{m}\binom{n}{k}p^k(1-p)^{n-k} \qquad (1)$$

where k is the number of subframes out of n subframes that are reported as NACK or DTX.

To get a desired false-detection rate for collision, the expected number of subframes that are reported as NACK or DTX (N_NACKed) can be different depending on the maximum length of channel occupancy, TxOP length and the number of subframes in a burst. The expected number of subframes that are reported as NACK or DTX (N_NACKed) may be fixed for each TxOP length, or may be configured by higher layer signaling.

If the number of NACK or DTX received for the previous LAA burst of subframes is higher than or equal to the expected number of subframes (N_NACKed), the eNB 160 may assume a collision occurs. In other words, the predetermined percentage or more NACK or DTX is fed back, the eNB 160 may assume a collision occurs. In this case, the eNB 160 may increase the CW size for the backoff and contention access of the next LAA burst of subframes.

If the number of NACK or DTX received for the previous LAA burst of subframes is less than the expected number of subframes (N_NACKed), the eNB 160 may assume no collision occurs and may reduce the CW size. In one implementation, the CW size is set to the initial CW size. In another implementation, the CW window is reduced to the next lower CW size.

In yet another implementation, if all subframes are reported as ACK, the CW size may be set to the initial CW size if at least one NACK or ACK is received but the number of NACK or DTX received for the previous LAA burst of subframes is less than the expected number of subframes (N_NACKed). The eNB 160 may keep the current CW size. Moreover, the CW size adjustment may be a step function based on the number of NACK or DTX received for the previous LAA burst of subframes or TxOP.

In another implementation, a look-up table may be used to link the CW size and the number of NACK or DTX in an LAA subframe burst or TxOP. The look-up table can be different depending on the maximum length of channel occupancy, TxOP length and the number of subframes in a burst. The look-up table can be fixed for each TxOP length, or can be configured by higher layer signaling.

In a fourth approach for estimating channel collision (Approach 4), the NACK or DTX of the initial transmission may be excluded from the channel collision estimation. The design of the HARQ-ACK process allows soft-combining of multiple transmissions of the same data. This may greatly increase the spectrum efficiency. Thus, a high NACK probability for the initial transmission is intentional by design. After even the first retransmission, the PDSCH error probability may be reduced to less than 1%.

Therefore, when the eNB 160 determines the collision, the NACK or DTX of the PDSCH with an initial transmission may be ignored. This will reduce the misdetection of a collision due to the normal HARQ-ACK process. When determining NACK or DTX feedback, this fourth approach can be applied in addition to approaches 1-3 above for collision estimation and CW size adjustment.

In another alternative, the eNB 160 may configure whether the NACK or DTX of the initial transmission is included in the collision estimation or not. The eNB 160 may configure this based on the observed channel occupancy, average idle period length, average CW size, etc.

Approaches 1-3 consider the HARQ-ACK reporting results from the previous LAA subframe burst or TxOP. The CW size may be dynamically adjusted based on the collision estimation results. However, these approaches 1-3 do not consider the locations of UEs 102. For example, a first UE 102 may report a NACK or DTX due to collision, and a second UE 102 may not experience collision and reports an ACK. If in the next LAA burst, only subframes to the second UE 102 are scheduled, the LAA cell should not perform a CW size increase because no collision is observed at the second UE 102.

Therefore, the HARQ-ACK process of each LAA subframe may be considered to determine the CW size. In an LTE DL subframe, new data filed in the DCI format may be used to indicate whether the PDSCH is a retransmission or a new transport block (TB). Furthermore, the eNB 160 may know how many times a PDSCH is re-transmitted.

In other approaches, the CW size may be adjusted based on the number of subframes for retransmission and/or the number of retransmissions for a subframe. For example, in a fifth approach for estimating channel collision (Approach 5), the CW may be adjusted based on the number of subframes for retransmissions in a burst.

In one implementation of Approach 5, a threshold number for the subframes with retransmissions (N_ReTx) may be defined or configured. If the number of subframes with retransmissions in an LAA subframe burst or TxOP is the same as or larger than the threshold number N_ReTx, the eNB 160 may assume collision occurs. The eNB 160 may then increase the CW size to the next level. If the number of subframes with retransmissions in an LAA subframe burst or TxOP is smaller than the threshold number N_ReTx, the eNB 160 may assume no collision occurs. The eNB 160 may then decrease the CW size. In one implementation, the CW size may be set to the initial CW size. In another implementation, the CW window may be reduced to the next lower CW size.

The threshold for the number of subframes with retransmissions (N_ReTx) can be different depending on the maximum length of channel occupancy, the TxOP length and the number of subframes in a burst. The N_ReTx can be fixed for each TxOP length, or can be configured by higher layer signaling.

In another implementation of Approach 5, a look-up table may be used to link the CW size and the number of retransmissions in an LAA subframe burst or TxOP. The look-up table can be different depending on the maximum length of channel occupancy, TxOP length and the number of subframes in a burst. The look-up table can be fixed for each TxOP length, or can be configured by higher layer signaling.

The CW size may be determined based how many subframes in the previous LAA TxOP that are retransmissions. The CW size may be increased, decreased or may remain the same depending on the observed number of subframes on the previous LAA TxOP that are retransmissions. Table (1) gives an example of a CW look-up table, assuming a TxOP includes up to 4 subframes.

TABLE 1

| Number of subframes with retransmission | CW adjustment |
| --- | --- |
| 0 | Set to initial CW size CW0 |
| 1 | Unchanged |

TABLE 1-continued

| Number of subframes with retransmission | CW adjustment |
| --- | --- |
| 2 or more | Increase the CW size to the next level |

Table (2) gives another example of a CW look-up table. In Table (2), the CW size is selected based on the observed number of subframes with retransmissions. In this example, CW0<CW1<CW2<CW3<CW4. The CW size may be exponential such that $CW_i = 2^i CW_0$, where i is the ith level CW size.

TABLE 2

| Number of retransmission | CW size |
| --- | --- |
| 0 | Initial CW size CW0 |
| 1 | CW1 |
| 2 | CW2 |
| 3 | CW3 |
| 4 | CW4 |

It should be noted that Approach 5 may be combined with Approach 4. Because the likelihood of NACK or DTX is high for the initial PDSCH transmission, the first retransmission of a PDSCH in an LAA subframe may not be counted as a retransmission.

In a sixth approach for estimating channel collision (Approach 6), the CW may be adjusted based on the number of retransmissions of the subframes in a burst. The eNB 160 schedules all DL and UL transmissions, and knows the number of retransmissions experienced at each HARQ-ACK process. Thus, the eNB 160 may determine the CW size adjustment based on the number of retransmissions for the LAA subframes in a subframe burst or TxOP.

In one implementation of this approach, the CW size may be determined based on the maximum number of retransmissions of the subframes in the LAA TxOP. The subframe with the maximum number of retransmissions experiences the worst channel condition or collisions.

Table (3) gives an example of a CW look-up table where the contention window size is selected based on the observed maximum number of retransmissions of the subframes in an LAA TxOP. In this example, CW0<CW1<CW2<CW3<CW4. The CW size may be exponential such that $CW_i = 2^i CW_0$, where i is the ith level CW size.

TABLE 3

| Maximum number of retransmissions | CW size |
| --- | --- |
| 0 | Initial CW size CW0 |
| 1 | CW1 |
| 2 | CW2 |
| 3 | CW3 |
| 4 | CW4 |
| >4 | Maximum CW size CWmax |

Table (4) provides another example of CW size adjustment based on the maximum number of retransmissions for the subframes in a TxOP.

TABLE 4

| Maximum number of retransmissions | CW size |
| --- | --- |
| 0 | Set to initial CW size CW0 |
| 1 | Maintain the same CW size |
| 2 | Increase the CW size |

In another implementation of this approach, the CW size may be determined based on the minimum number of retransmissions of the subframes in the LAA TxOP. This may provide a more aggressive transmission.

In yet another implementation of this approach, the CW size may be determined based on the average number of retransmissions of the subframes in the LAA TxOP. The average number of retransmissions may be rounded to the closest integer, or using a floor function or a ceiling function. This may provide a more balanced tradeoff between CW size adjustment and channel collision.

In another implementation of this approach, the eNB 160 may configure which number of retransmissions should be used for the CW size determination.

In both Approach 5 and Approach 6, in an implementation, the PDSCH retransmission status may be based on a previous LAA subframe burst or TxOP (e.g., the last LAA subframe burst or TxOP) because the PDSCH retransmission status may be updated based on the HARQ-ACK feedback.

The timing to apply the determined contention window size may be similar as in the previous approaches (i.e., Approaches 1-4). Thus, for a contention access and backoff immediately after the LAA burst, the current CW size may be used for the next LAA transmission before all HARQ-ACK feedback, if received. The new CW size may be applied after all HARQ-ACK feedback is received and evaluated.

More specifically, HARQ-ACKs associated with the DL burst that ends at subframe n+3 (i.e., HARQ-ACKs fed back from subframe n−k+8 until subframe n+7, where k is the number of subframes within the corresponding DL burst) could be used for the CW size derivation for an LBT that is potentially performed at subframe n+8 or later. Conversely, for LBT at subframe n, the HARQ-ACKs associated with the DL burst that ends at subframe n−5 or earlier (i.e., HARQ-ACKs fed back from subframe n−k or earlier until subframe n−1) could be used.

Processing time may also be considered. Given that the required processing time is x ms, the HARQ-ACKs associated with the DL burst that ends at subframe n+3 could be used for an LBT that is potentially performed at subframe n+x+8 or later. In other words, for an LBT at subframe n, the HARQ-ACKs associated with the DL burst that ends at subframe n−x−5 or earlier (i.e., HARQ-ACKs fed back from subframe n−x−k or earlier until subframe n−x−1) could be used. The value of the above-described x may be configurable.

Alternatively, the application of the HARQ-ACK to the CW size derivation may be based on a fixed timing. This may be on a radio frame basis. For example, the CW size of the potential LBT in radio frame N (or multiple radio frames starting at radio frame N) may be updated on the basis of the HARQ-ACKs reported within radio frame N−1 (or multiple radio frames ending at radio frame N−1). If processing time x is required, the contention window size of the potential LBT in radio frame N (or multiple radio frames starting at radio frame N) may be updated on the basis of the HARQ-ACKs reported within radio frame N−x−1 (or multiple radio frames ending at radio frame N−x−1). The value of the above-described x may be configurable.

In another implementation, the subframe retransmission status may be based on pending LAA subframes for an LAA subframe burst or TxOP (e.g., the current LAA subframes in the queue contending for LAA transmission in a subframe burst or TxOP). The HARQ-ACK status of pending subframes may be already known, thus the determined contention window size can be applied immediately after the previous LAA burst or TxOP transmission. In this implementation, there is no need to wait for the feedback results of the previous LAA transmissions. Furthermore, the pending subframes may be targeted to different UEs 102 from the previous LAA burst or TxOP. Thus, determining the channel conditions based on the receiver UEs 102 may be better than determining the channel condition based on other UEs 102.

In yet another implementation, the subframe retransmission status may be based on all existing HARQ-ACK processes. The HARQ-ACK process status may already be known at the eNB 160. Thus, the determined CW size can be applied immediately after the previous LAA burst or TxOP transmission.

The described systems and methods provide for variable CW size adjustments of LAA transmission. In another approach to CW size adjustment, the CW size may be adjusted through semi-static CW adjustment. In one configuration, the semi-static CW adjustment module 196 may perform semi-static CW size adjustment.

Although dynamic CW adjustment provides quick transmit probability adjustment, the dynamic variable CW size backoff (e.g., exponential backoff) has several issues. The cell or station that gets the channel at a smaller CW size has a high chance to seize the channel again before a cell or station with a larger CW size. Thus, it may cause fairness issues to starve the traffic on the cell or device with the larger CW size. Furthermore, an expected number of collisions will occur to reach an equilibrium condition. This may incur channel resource waste and excessive collisions.

Therefore, if an eNB 160 has a good estimation of the channel condition, a fixed CW size may provide the best channel access probabilities. Moreover, even with dynamic exponential backoff, the eNB 160 may choose an optimal initial CW size to reduce the collision probability and the levels of exponential CW change. Thus, the initial CW size may be determined or configured in a semi-static manner based on observed channel conditions.

The HARQ-ACK process may be intentionally set for a high NACK probability of at least 10%. However, the actual collision probability may be much lower than the observed NACK feedback. Therefore, it may be better to choose a CW size semi-statically to avoid excessive collision at a smaller initial CW size. The semi-static CW size may be based on statistic results of various aspects.

In one approach, the semi-static CW size may be determined based on the observed channel occupancy. The channel occupancy may be the ratio that the channel is sensed as busy or the LAA cell is transmitting. The initial CCA and defer periods after a busy channel may be included in the busy period. The higher the channel occupancy, the smaller the CW size may be. A look-up table may be included to determine the CW size. Table (5) is an example look-up table for CW size based on channel occupancy.

TABLE 5

| Channel occupancy | CW size |
| --- | --- |
| <10% | Initial CW size CW0 |
| 10%-25% | CW1 |
| 25-50% | CW2 |
| 50-75% | CW3 |
| >75% | Maximum CW size CWmax |

In another approach, the semi-static CW size may be determined based on the observed average number of continuous idle ECCA slots or some other statistic (e.g., median or specific quantile) of availability of ECCA slots. If the average number of continuous idle ECCA slots is higher, the channel is less congested. A look-up table may be included to determine the CW size.

In yet another approach, the semi-static CW size may be determined based on the observed average number of NACK or DTX received in an LAA TxOP. The number of NACK or DTX received in an LAA TxOP may be determined as in the dynamic CW adjustment approaches 1-4.

In another approach, the semi-static CW size may be determined based on the observed average number of subframes with retransmissions in an LAA TxOP. The number of subframes with retransmissions in an LAA TxOP may be determined as in the dynamic CW adjustment Approach 5.

In yet another approach, the semi-static CW size may be determined based on the observed average number of retransmissions in the subframes of an LAA TxOP. The number of retransmissions in the subframes of an LAA TxOP may be determined as in the dynamic CW adjustment Approach 6.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 190 to the one or more receivers 178. For example, the eNB operations module 182 may inform the receiver(s) 178 when to receive transmissions from the UE(s) 102.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
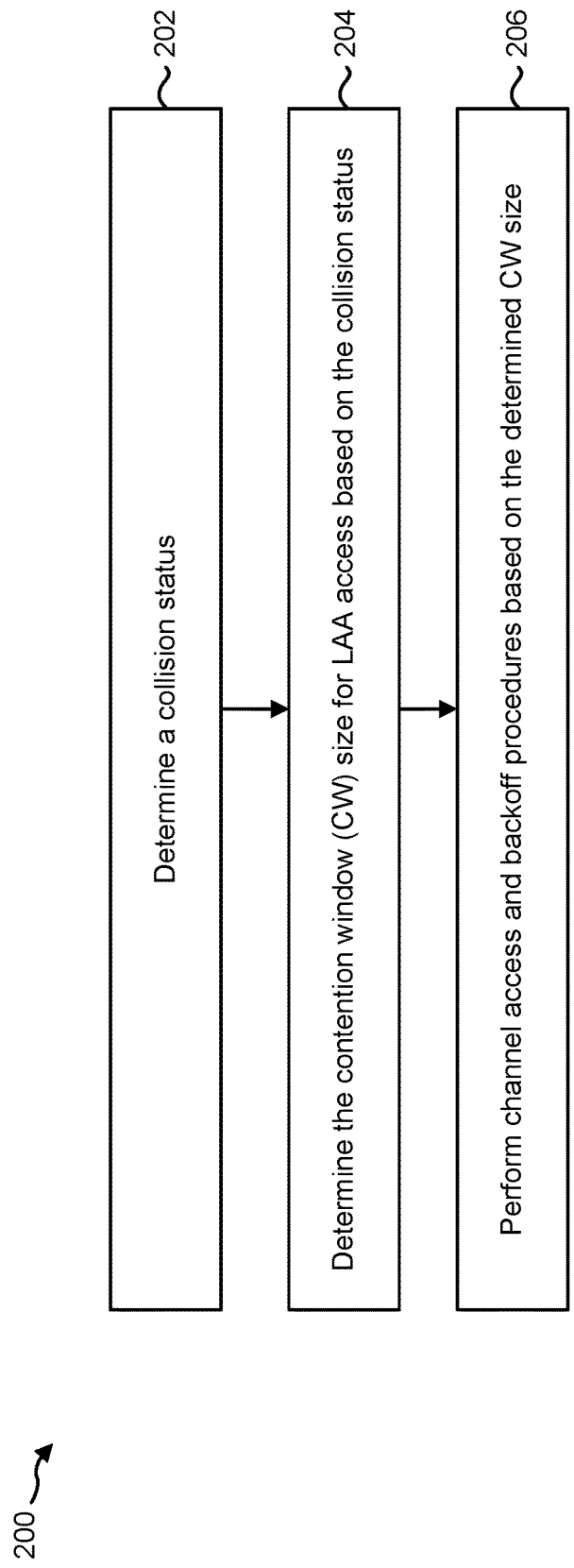
FIG. 2 is a flow diagram illustrating a method for contention access of an LAA serving cell by an eNB.

FIG. 2 is a flow diagram illustrating a method 200 for contention access of a Licensed-Assisted Access (LAA) serving cell by an eNB 160. The eNB 160 may communicate with one or more UEs 102 in a wireless communication network. In one implementation, the wireless communication network may include an LTE network. The eNB 160 may configure an unlicensed LAA cell from a licensed LTE cell.

The eNB 160 may determine 202 a collision status. The collision status may be based on a previous LAA transmission. A HARQ-ACK report of LAA subframes may indicate the status of an LAA subframe transmission. Thus, the HARQ-ACK feedback may be used to assess whether a collision occurs on the LAA transmissions.

In a first approach, the eNB 160 may set the collision status as a collision occurs if any subframe of an LAA subframe burst or TxOP is reported as NACK or DTX from the scheduled UEs 102. The eNB 160 may set the collision status as no collision occurs if all subframes of the LAA subframe burst or TxOP are reported as ACK from the scheduled UEs 102. The eNB 160 may set the collision status as a collision occurs in a subframe if there are multiple PDSCH transmissions scheduled for multiple UEs 102 and any UE 102 reports a NACK or DTX for the scheduled PDSCH of the subframe. In other words, the eNB 160 may assume a collision occurs if there are multiple PDSCH transmissions scheduled for multiple UEs 102 and any UE 102 reports a NACK or DTX for the scheduled PDSCH of the subframe.

In a second approach, the eNB 160 may set the collision status as a collision occurs if the first subframe in an LAA subframe burst or TxOP is reported as NACK or DTX from the scheduled UEs 102. The eNB 160 may set the collision status as no collision occurs if the first subframe in the LAA subframe burst or TxOP is reported as ACK from the scheduled UEs 102.

In a third approach, the eNB 160 may determine the expected number of subframes that are reported as NACK or DTX. This expected number of subframes may be referred to as N_NACKed. In one implementation, N_NACKed may be set as a fixed number. In another implementation, N_NACKed may be configured with higher layer signaling.

The eNB 160 may determine the number of subframes in an LAA subframe burst or TxOP that are reported as NACK or DTX from the scheduled UEs 102. The eNB 160 may set the collision status as a collision occurs if there are N_NACKed or more subframes in the LAA subframe burst or TxOP that are reported as NACK or DTX from the scheduled UEs 102.

In a fourth approach, the eNB 160 may determine if an LAA subframe is an initial transmission. If the LAA subframe is an initial transmission, the eNB 160 may not treat the NACK or DTX feedback of the LAA subframe as a NACK or DTX. Thus, the NACK or DTX of the initial transmission may be excluded from the channel collision estimation.

In a fifth approach, the eNB 160 may determine a collision condition based on a retransmission status of subframes in an LAA burst or TxOP. The eNB 160 may determine a value N_ReTx as a threshold number of retransmissions. Then eNB 160 may determine the number of subframes with retransmission in an LAA burst or TxOP. The eNB 160 may set the collision status as a collision occurs if the number of subframes with retransmission in the LAA burst or TxOP is greater or equal to N_ReTx.

In a sixth approach, the eNB 160 may determine the number of retransmissions of the subframes in an LAA burst or TxOP. The eNB 160 may determine the collision status based on the number of retransmissions of the subframes in the LAA burst or TxOP. In one implementation, the eNB 160 may determine the number of retransmissions of the subframes in the LAA burst or TxOP based on the maximum number of retransmissions of the subframes in the LAA burst or TxOP. In another implementation, the eNB 160 may determine the number of retransmissions of the subframes in the LAA burst or TxOP based on the average number of retransmissions of the subframes in the LAA burst or TxOP.

The eNB 160 may determine 204 the contention window (CW) size for LAA access based on the collision status. In one implementation, the CW size may be increased if the eNB 160 sets the collision status as a collision occurs. The CW size may be decreased if the eNB 160 sets the collision status as no collision occurs. For example, the CW size may be set as the initial CW size if the eNB 160 determines that no collision occurs.

In another implementation, the eNB 160 may determine 204 the CW size based on a look-up table. In one configuration, the look-up table may specify a correspondence between the CW size and the number of NACK of DTX received in an LAA subframe burst or TxOP. In another configuration, the look-up table may specify a correspondence between the CW size and the number of subframes with retransmissions in an LAA subframe burst or TxOP. In yet another configuration, the look-up table may specify a correspondence between the CW size and the number of retransmissions of the subframes in an LAA subframe burst or TxOP.

In yet another implementation, the CW size may be updated semi-statically based on statistic results. In a first implementation, the statistic results are determined based on an observed channel occupancy. In a second implementation, the statistic results are determined based on an average length of the idle period. In a third implementation, the statistic results are determined based on an average number of NACK or DTX received in an LAA burst or TxOP. In a fourth implementation, the statistic results are determined based on an average number of retransmissions in an LAA burst or TxOP.

The eNB 160 may perform 206 channel access and backoff procedures based on the determined CW size. For example, the eNB 160 may reinitialize a backoff counter based on the determined CW size. In an implementation, a backoff counter is generated randomly between 0 and CW−1, the LAA cell may transmit when the counter becomes 0. Then a new backoff process is created for a pending subframe with a CW size (which may be adjusted) based on the feedback information. A general description of channel access and backoff procedure is described in connection with FIG. 5.

As used herein, channel access may also be referred to as contention access. Therefore, a channel access procedure may be referred to as a contention access procedure. For an unlicensed band, channel access is contention based (as compared to a dedicated channel for licensed transmissions).

FIG. 3 illustrates an example of collision due to simultaneous transmissions. An eNB 360 may communicate with a first UE 302a and a second UE 302b in an LAA cell. An unlicensed node 325 may also communicate with the first UE 302a. Transmission from the unlicensed node 325 is within the sensing distance of the given LAA cell.

In this example, a transmission from the LAA cell and a transmission from the unlicensed node 325 may start at the same time (i.e., the transmissions may have the same beginning). The first UE 302a may detect a collision of the transmissions, as indicated by the transmission collision region 335.

In this example, the simultaneous transmission of the unlicensed node 325 occurs within an ECCA slot of the LAA cell. This scenario is likely to cause reception errors at the first UE 302a, especially in the beginning of the LAA TxOP. These kinds of collisions may be reduced by adjusting the CW size.

FIG. 4 illustrates an example of collision due to simultaneous transmission of a hidden terminal. An eNB 460 may communicate with a first UE 402a and a second UE 402b in an LAA cell. An unlicensed node 425 may also communicate with the first UE 402a. Transmission from the unlicensed node 425 is not within the sensing distance of the LAA cell. Therefore, in this case, the unlicensed node 425 is considered a hidden terminal.

In this example, a transmission from the LAA cell and a transmission from the unlicensed node 425 may start at the different times. The LAA cell may begin transmission and a transmission from the unlicensed node 425 may collide with the transmission from the LAA cell. The first UE 402a may detect a collision of the transmissions, as indicated by the transmission collision region 435. This scenario may cause reception errors at any part of an LAA TxOP.

FIG. 5 is a flow diagram illustrating a method 500 for LAA state transition with variable length backoff. The method 500 may be implemented by an eNB 160. The eNB 160 may communicate with one or more UEs 102 in a wireless communication network. In one implementation, the wireless communication network may include an LTE network. The eNB 160 may configure an unlicensed LAA cell from a licensed LTE cell. FIG. 5 illustrates an example of channel access and backoff procedures that may be performed by the eNB 160 based on a CW size determination.

The eNB 160 may perform an initial CCA procedure. The eNB 160 may enter 502 an idle state. The eNB 160 may determine 504 whether it needs to transmit. If the eNB 160 does not need to transmit, then the eNB 160 may re-enter 502 the idle state.

If the eNB 160 determines 504 that it does need to transmit, then the eNB 160 may determine 506 whether a channel in the unlicensed spectrum (e.g., an LAA channel) is idle for an initial CCA period (BiCCA). For example, the eNB 160 may determine whether the channel has been idle for at least 34 microseconds (us). If the channel has been idle for the initial CCA period, then the eNB 160 may transmit 508. The eNB 160 may determine 510 whether another transmission is needed. If no transmission is needed, the eNB 160 may re-enter 502 the idle state.

If the eNB 160 determines 510 that another transmission is needed or the eNB 160 determines 506 that the channel is not idle for the initial CCA period, then the eNB 160 may perform an extended CCA (ECCA) procedure. The eNB 160 may generate 512 a random counter N out of [0, q−1]. In this case, the random counter N is the backoff counter. In an implementation of the backoff process, N is suspended if the channel is busy. The LAA cell may transmit if N becomes 0.

The eNB 160 may generate 512 the random counter using a contention window (CW) size (q). The eNB 160 may update 514 the CW between X and Y via a dynamic exponential backoff or a semi-static backoff. X may be a minimum CW size (CW0) and Y may be a maximum CW size (CWmax). The eNB 160 may update 514 the CW size using input (e.g., ACKs/NACKs) as described above in connection with FIG. 1.

Upon generating 512 the random counter N, the eNB 160 may determine 516 whether the channel has been idle for an eCCA defer period (DeCCA). For example, the eNB 160 may determine whether the channel has been idle for at least 34 microseconds (us). If the channel has not been idle for the eCCA defer period, then the eNB 160 may continue to determine 516 whether the channel has been idle for an eCCA defer period.

If the eNB 160 determines 516 that the channel has been idle for an eCCA defer period, then the eNB 160 may determine 518 whether the random counter N equals 0. If the random counter N equals 0, then the eNB 160 may transmit 508. If the random counter N does not equal 0, then the eNB 160 may sense 520 the medium for one eCCA slot duration (T). For example, the eNB 160 may sense 520 the medium for 9 us or 10 us.

Upon sensing 520 the medium for the one eCCA slot duration, the eNB 160 may determine 522 whether the channel is busy. If the channel is busy, then the eNB 160 may wait and determine 516 whether the channel has been idle for the eCCA defer period. If the channel is not busy, then the eNB 160 may reduce 524 the random counter N by 1 (e.g., N=N−1). The eNB 160 may then determine 518 whether the random counter N equals 0.

FIG. 6 is a block diagram illustrating HARQ-ACK feedback 633 for an LAA subframe burst 627. In this example, the LAA subframe burst 627 includes four LAA subframes 629. The LAA subframe burst 627 may be sent on the downlink (DL) to a UE 102. Each LAA subframe 629 may have a subframe number (e.g., n, n+1, etc.). The LAA subframes 629 may contain a PDSCH transmission for one or more UEs 102.

The UE 102 may provide UL feedback 631. In this example, the UE 102 may send HARQ-ACK feedback 633 corresponding to an LAA subframe 629 in the LAA subframe burst 627. For a first LAA subframe 629*a* (n) sent on the DL, the UE 102 may send a first HARQ-ACK feedback 633*a* at subframe n+4. For a second LAA subframe 629*b* (n+1), the UE 102 may send a second HARQ-ACK feedback 633*b* at subframe n+5. For a third LAA subframe 629*c* (n+2), the UE 102 may send a third HARQ-ACK feedback 633*c* at subframe n+6. For a fourth LAA subframe 629*d* (n+3), the UE 102 may send a third HARQ-ACK feedback 633*d* at subframe n+7.

Assuming a minimum gap of 4 ms between an LAA subframe 629 and the HARQ-ACK feedback 633, 8 ms is required from the start of the LAA subframe burst 627 transmission to the reception of all HARQ-ACK feedback 633.

Figure 7:
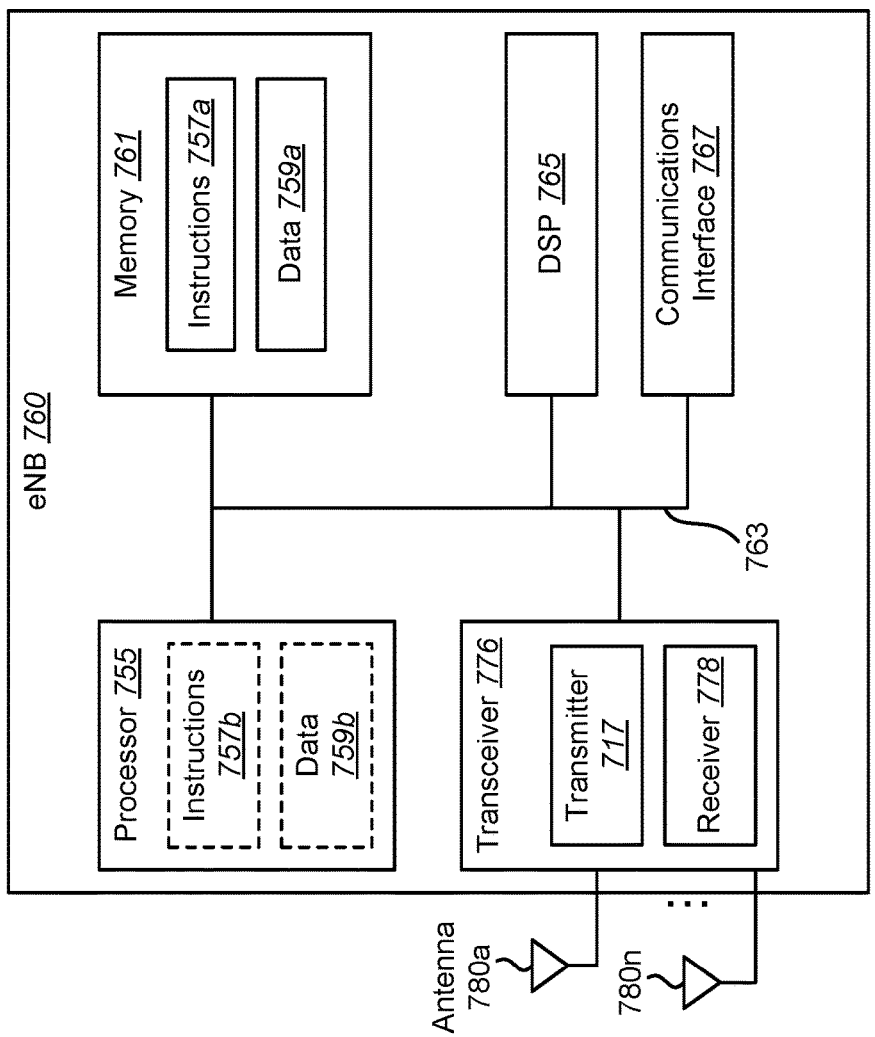
FIG. 7 illustrates various components that may be utilized in an eNB.

FIG. 7 illustrates various components that may be utilized in an eNB 760. The eNB 760 described in connection with FIG. 7 may be implemented in accordance with the eNB 160 described in connection with FIG. 1. The eNB 760 includes a processor 755 that controls operation of the eNB 760. The processor 755 may also be referred to as a central processing unit (CPU). Memory 761, which may include read-only memory (ROM), random access memory (RAM), a combination of the two or any type of device that may store information, provides instructions 757*a* and data 759*a* to the processor 755. A portion of the memory 761 may also include non-volatile random access memory (NVRAM). Instructions 757*b* and data 759*b* may also reside in the processor 755. Instructions 757*b* and/or data 759*b* loaded into the processor 755 may also include instructions 757*a* and/or data 759*a* from memory 761 that were loaded for execution or processing by the processor 755.

The eNB 760 may also include a housing that contains one or more transmitters 717 and one or more receivers 778 to allow transmission and reception of data. The transmitter(s) 717 and receiver(s) 778 may be combined into one or more transceivers 776. One or more antennas 780*a-n* are attached to the housing and electrically coupled to the transceiver 776.

The various components of the eNB 760 are coupled together by a bus system 763, which may include a power bus, a control signal bus and a status signal bus, in addition to a data bus. However, for the sake of clarity, the various buses are illustrated in FIG. 7 as the bus system 763. The eNB 760 may also include a digital signal processor (DSP) 765 for use in processing signals. The eNB 760 may also include a communications interface 767 that provides user access to the functions of the eNB 760. The eNB 760 illustrated in FIG. 7 is a functional block diagram rather than a listing of specific components.

Figure 8:
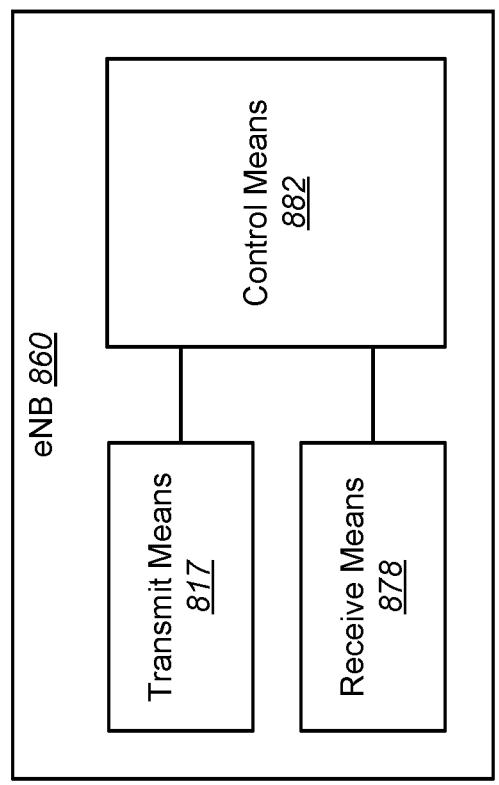
FIG. 8 is a block diagram illustrating one implementation of an eNB in which systems and methods for performing LAA may be implemented.

FIG. 8 is a block diagram illustrating one implementation of an eNB 860 in which systems and methods for performing LAA may be implemented. The eNB 860 includes transmit means 817, receive means 878 and control means 882. The transmit means 817, receive means 878 and control means 882 may be configured to perform one or more of the functions described in connection with FIG. 1 above. FIG. 7 above illustrates one example of a concrete apparatus structure of FIG. 8. Other various structures may be implemented to realize one or more of the functions of FIG. 1. For example, a DSP may be realized by software.

It should be noted that the above described approaches might not be orthogonal with one another. Some of them could be combined.

Figure 9:
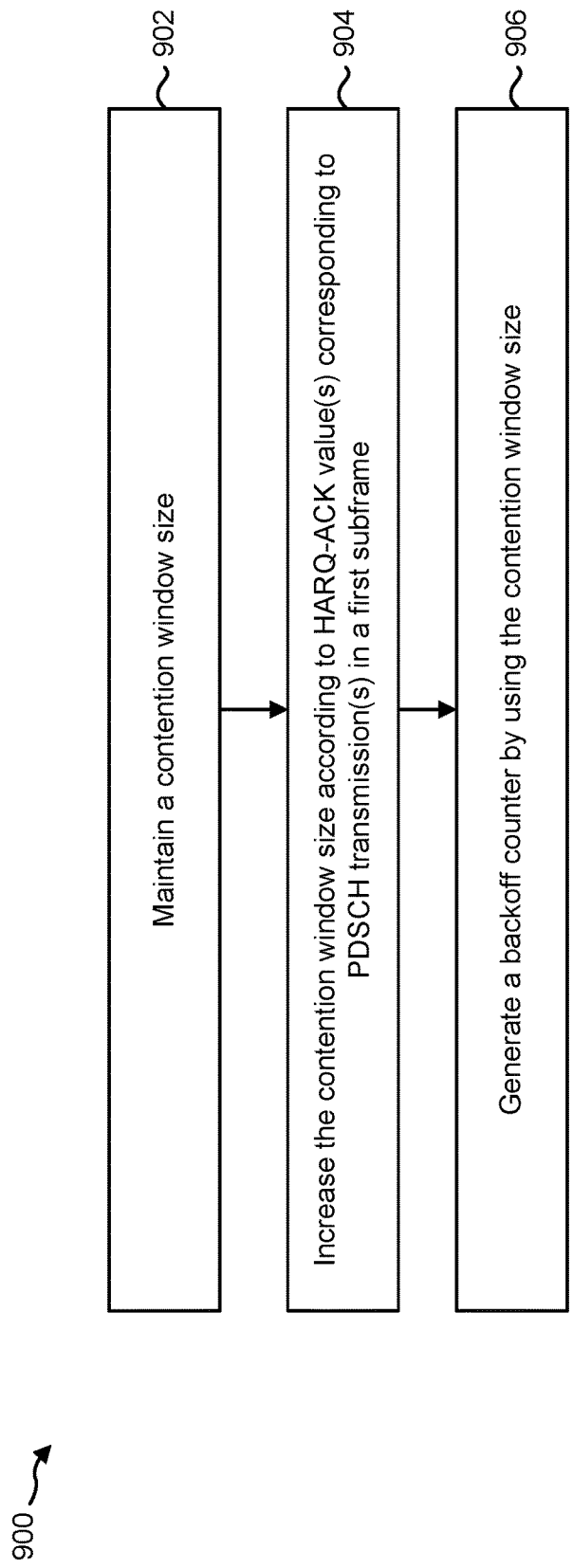
FIG. 9 is a flow diagram illustrating another method for contention access of a serving cell by an eNB.

FIG. 9 is a flow diagram illustrating another method 900 for contention access of a Licensed-Assisted Access (LAA) serving cell by an eNB 160. The eNB 160 may communicate with one or more UEs 102 in a wireless communication network. In one implementation, the wireless communication network may include an LTE network. The eNB 160 may configure an unlicensed LAA cell from a licensed LTE cell.

The eNB 160 may maintain 902 a contention window size. At least for a DL LAA transmission, listen before talk (LBT) with a variable backoff contention window (CW) size may be supported.

The eNB 160 may increase 904 the contention window size according to HARQ-ACK value(s) corresponding to PDSCH transmission(s) in a first subframe. The first subframe may be a starting subframe of a previous downlink transmission burst on an LAA carrier for which HARQ-ACK has been fed back. The contention window size may be increased 904 if a pre-determined percentage or more of the HARQ-ACK value(s) are determined as negative acknowledgment (NACK). A discontinuous transmission (DTX) state may be counted as NACK.

The eNB 160 may determine the expected number of subframes that are reported as NACK or DTX. As described above, this expected number of subframes may be referred to as N_NACKed.

The eNB 160 may determine the number of subframes in an LAA subframe burst or TxOP that are reported as NACK or DTX from the scheduled UEs 102. The eNB 160 may set the collision status as a collision occurs if there are N_NACKed or more subframes in the LAA subframe burst or TxOP that are reported as NACK or DTX from the scheduled UEs 102. Therefore, the CW may be increased 904 if more than one LAA subframe has a NACK or a DTX reported. If there are multiple subframes in an LAA burst transmission or TxOP, the collision condition may be further constrained if two or more LAA subframes are reported as NACK. This significantly reduces the false-alarm of collision due to NACK feedback of LTE subframes.

If the number of NACK or DTX received for the previous LAA burst of subframes is higher than or equal to the expected number of subframes (N_NACKed), the eNB 160 may assume a collision occurs. In other words, the pre-determined percentage or more NACK or DTX is fed back, the eNB 160 may assume a collision occurs. In this case, the eNB 160 may increase 904 the CW size for the backoff and contention access of the next LAA burst of subframes.

The eNB 160 may generate 906 a backoff counter by using the contention window size. For example, the contention window may be used to generate a random number for the backoff counter. The eNB 160 may reinitialize the backoff counter based on the determined CW size. In an implementation, the backoff counter is generated randomly between 0 and CW 1, the LAA cell may transmit when the counter becomes 0. This may be accomplished as described in connection with FIG. 5.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. An evolved NodeB (eNB), comprising:
   a processor; and
   a memory in electronic communication with the processor, wherein instructions stored in the memory are executable to:
   maintain a contention window size; and
   increase the contention window size according to hybrid automatic request acknowledgement/negative acknowledgment (HARQ-ACK) value(s) corresponding to physical downlink shared channel (PDSCH) transmission(s) in a first subframe, wherein the contention window size is increased if an amount of the HARQ-ACK value(s) determined as negative acknowledgment (NACK) is greater than or equal to a pre-determined percentage, and wherein
   the first subframe is a starting subframe of a previous downlink transmission burst on a licensed-assisted access (LAA) carrier for which HARQ-ACK has been fed back.

2. The eNB of claim 1, wherein: a discontinuous transmission (DTX) state is counted as NACK.

3. The eNB of claim 1, wherein:
   a backoff counter is generated by using the contention window size.

4. A method for an evolved NodeB (eNB), the method comprising:
   maintaining a contention window size; and
   increasing the contention window size according to hybrid automatic request acknowledgement/negative acknowledgment (HARQ-ACK) value(s) corresponding to physical downlink shared channel (PDSCH) transmission(s) in a first subframe, wherein
   the contention window size is increased if an amount of the HARQ-ACK value(s) determined as negative acknowledgment (NACK) is greater than or equal to a pre-determined percentage, and wherein
   the first subframe is a starting subframe of a previous downlink transmission burst on a licensed-assisted access (LAA) carrier for which HARQ-ACK has been fed back.

5. The method of claim 4, wherein: a discontinuous transmission (DTX) state is counted as NACK.

6. The method of claim 4, wherein:
   a backoff counter is generated by using the contention window size.

* * * * *